US012313993B2

(12) United States Patent
Okano et al.

(10) Patent No.: US 12,313,993 B2
(45) Date of Patent: May 27, 2025

(54) FIXING ROTATING MEMBER, FIXING DEVICE WITH FIXING ROTATING MEMBER ELECTROPHOTOGRAPHIC IMAGE FORMING DEVICE WITH FIXING ROTATING MEMBER, AND METHOD OF PRODUCING FIXING ROTATING MEMBER

(71) Applicant: CANON KABUSHIKI KAISHA, Tokyo (JP)

(72) Inventors: Akira Okano, Kanagawa (JP); Takaaki Tsuruya, Shizuoka (JP); Matsutaka Maeda, Kanagawa (JP); Makoto Souma, Kanagawa (JP); Naoko Kasai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/490,973

(22) Filed: Oct. 20, 2023

(65) Prior Publication Data

US 2024/0160136 A1 May 16, 2024

(30) Foreign Application Priority Data

Oct. 26, 2022 (JP) ................................ 2022-171566
Oct. 19, 2023 (JP) ................................ 2023-180568

(51) Int. Cl.
*G03G 15/20* (2006.01)
*H05B 6/14* (2006.01)
*H05B 6/38* (2006.01)

(52) U.S. Cl.
CPC ..... *G03G 15/2057* (2013.01); *G03G 15/2053* (2013.01); *H05B 6/145* (2013.01); *H05B 6/38* (2013.01); *H05B 2206/022* (2013.01)

(58) Field of Classification Search
CPC .. G03G 15/2053; G03G 15/2057; H05B 6/38; H05B 6/145; H05B 2206/022
See application file for complete search history.

(56) References Cited

U.S. PATENT DOCUMENTS

| | | | |
|---|---|---|---|
| 6,223,017 | B1 | 4/2001 | Akutsu et al. |
| 8,019,266 | B2 | 9/2011 | Baba et al. |
| 8,550,877 | B2 | 10/2013 | Hiroshi et al. |
| 9,563,159 | B2 | 2/2017 | Jota et al. |

(Continued)

FOREIGN PATENT DOCUMENTS

| | | | |
|---|---|---|---|
| EP | 3 835 060 | A1 | 6/2021 |
| JP | 10-165311 | A | 6/1998 |

(Continued)

OTHER PUBLICATIONS

Nobuyuki Otsu, "A Threshold Selection Method from Gray-Level Histograms," SMC-9(1) IEEE Trans. Syst. Man Cybern. 62-66 (Jan. 1979).

(Continued)

*Primary Examiner* — Sophia S Chen
(74) *Attorney, Agent, or Firm* — Venable LLP

(57) ABSTRACT

A fixing rotating member that includes: a cylindrical base member comprising at least a resin; an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer containing silver, the electro-conductive layer having a volume resistivity of $1.0\times10^{-8}$ to $8.0\times10^{-8}$ $\Omega\cdot m$, and the electroconductive layer having a compressive elastic modulus of 8 to 30 GPa, the elastic modulus being measured by contacting an indenter with a first surface of the electroconductive layer opposite to a surface facing the base member, and the elastic modulus being an average value of elastic moduli of a thickness region of 0.1 to 0.2 μm from the first surface of the electroconductive layer.

16 Claims, 8 Drawing Sheets

(56) References Cited

U.S. PATENT DOCUMENTS

| | | | |
|---|---|---|---|
| 10,012,935 B2 | 7/2018 | Nishizawa et al. | |
| 10,216,130 B2 | 2/2019 | Imaizumi et al. | |
| 10,452,012 B2 | 10/2019 | Usui et al. | |
| 10,802,433 B1 | 10/2020 | Watanabe et al. | |
| 11,644,777 B2 | 5/2023 | Ishifuji et al. | |
| 2006/0204295 A1 | 9/2006 | Takagi et al. | |
| 2008/0124147 A1 | 5/2008 | Uehara et al. | |
| 2016/0026127 A1 | 1/2016 | Hayasaki et al. | |
| 2017/0160682 A1 | 6/2017 | Nishizawa et al. | |
| 2019/0033758 A1* | 1/2019 | Uehashi | G03G 15/2057 |
| 2022/0394821 A1 | 12/2022 | Tong et al. | |
| 2024/0160135 A1* | 5/2024 | Maeda | G03G 15/2057 |
| 2024/0168420 A1* | 5/2024 | Souma | H05B 6/38 |

FOREIGN PATENT DOCUMENTS

| | | | |
|---|---|---|---|
| JP | 2005-202272 A | 7/2005 | |
| JP | 2006-10884 A | 1/2006 | |
| JP | 2008-152247 A | 7/2008 | |
| JP | 2012-68513 A | 4/2012 | |
| JP | 2013-228708 A | 11/2013 | |
| JP | 2018-133157 A | 8/2018 | |
| JP | 2020-105551 A | 7/2020 | |
| JP | 2021-51136 A | 4/2021 | |
| WO | WO-2016208153 A1 * | 12/2016 | G03G 15/2057 |

OTHER PUBLICATIONS

Non-final Office Action in U.S. Appl. No. 18/490,933 (Sep. 2024).
U.S. Appl. No. 18/490,924, filed Oct. 20, 2023, Souma et al.
U.S. Appl. No. 18/490,933, filed Oct. 20, 2023, Maeda et al.
Non-final Office Action in U.S. Appl. No. 18/490,924 (Jan. 2025).
Final Office Action in U.S. Appl. No. 18/490,933 (Apr. 2025).

* cited by examiner

FIXING ROTATING MEMBER, FIXING DEVICE WITH FIXING ROTATING MEMBER ELECTROPHOTOGRAPHIC IMAGE FORMING DEVICE WITH FIXING ROTATING MEMBER, AND METHOD OF PRODUCING FIXING ROTATING MEMBER

BACKGROUND

Technical Field

The present disclosure relates to a fixing rotating member used in a fixing device of an electrophotographic image forming device such as an electrophotographic copying machine or printer.

Description of the Related Art

A general fixing device mounted in an electrophotographic image forming device such as an electrophotographic copying machine or printer fixes a toner image on a recording material by heating while transporting the recording material carrying an unfixed toner image at a nip part formed by a fixing rotating member to be heated and a pressing roller that comes into contact therewith.

An electromagnetic induction heating type fixing device in which a fixing rotating member has an electro-conductive layer and the electro-conductive layer can be directly heated has been developed and put into practical use. The electromagnetic induction heating type fixing device has an advantage of a short warm-up time.

The electro-conductive layer is required to have conductivity and durability against repeated strain under heating, and in Japanese Patent Application Publication No. 2021-51136, a fixing member having an electro-conductive layer formed by copper plating is disclosed.

SUMMARY

At least one aspect of the present disclosure is directed to providing a fixing rotating member having high electro-conductivity and excellent durability. At least one aspect of the present disclosure is directed to providing a fixing device which can contribute to stable forming of an electrophotographic image with high quality. In addition, at least one aspect of the present disclosure is directed to providing an electrophotographic image forming apparatus that is able to form an electrophotographic image with high quality stably.

According to at least one aspect of the present disclosure, there is provided a fixing rotating member comprising: a cylindrical base member comprising at least a resin; an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer comprising silver, the electro-conductive layer having a volume resistivity of $1.0\times10^{-8}$ to $8.0\times10^{-8}$ Ω·m, and the electroconductive layer having a compressive elastic modulus of 8 to 30 GPa, the compressive elastic modulus being measured by contacting an indenter with a first surface of the electroconductive layer opposite to a surface facing the base member, and the compressive elastic modulus being an average of compressive elastic moduli of a thickness region of 0.1 to 0.2 μm from the first surface of the electroconductive layer.

Moreover, at least one aspect of the present disclosure is directed to providing a fixing device comprising the fixing rotating member and an induction heating device for heating the fixing rotating member by induction heating.

Furthermore, at least one aspect of the present disclosure is directed to providing an electrophotographic image forming device, comprising:

an image bearing member that carries a toner image;

a transfer device that transfers the toner image to a recording material; and a fixing device that fixes the transferred toner image to the recording material, wherein the fixing device is the above fixing device.

Furthermore, at least one aspect of the present disclosure is directed to providing a method of producing the above fixing rotating member, comprising:

(i) a step of obtaining the base member;

(ii) a step of obtaining an electro-conductive layer by applying a silver nanoparticle ink onto the outer circumferential surface of the base member obtained in the step (i) and performing firing; and (iii) a step of obtaining a resinous layer by applying a resin material onto the electro-conductive layer obtained in the step (ii) and performing firing.

Further features of the present disclosure will become apparent from the following description of exemplary embodiments with reference to the attached drawings.

DESCRIPTION OF THE EMBODIMENTS

Figure 1:
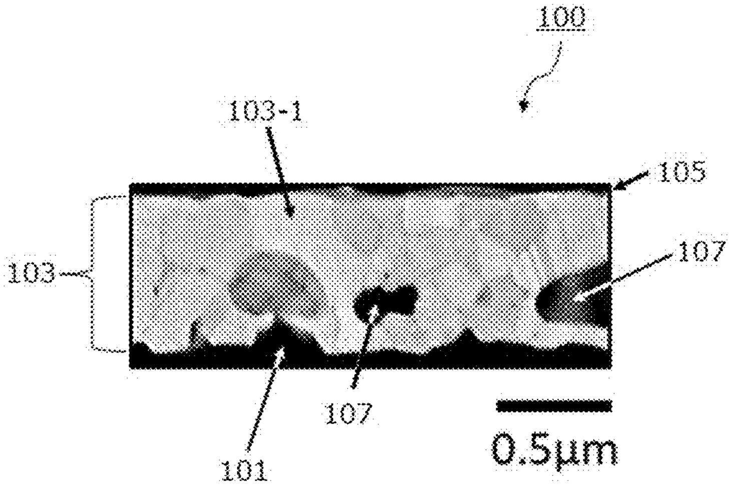
FIG. 1 is a cross-sectional image of an electro-conductive layer (a photograph in place of a drawing)

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

In recent years, there has been a demand for further improvement in durability of fixing members as the speed of printers has increased. In fixing members, when sheets of paper with different sizes are loaded, since a pressure is applied locally at the end of the paper, a so-called paper edge, durability against a partial compressive load is required. Particularly, in a configuration in which a plurality of conductive layers are formed on the outer circumferential surface of a base member layer, as disclosed in Japanese Patent Application Publication No. 2021-51136, when the paper edge is subjected to repeated compression deformation, if the difference in compressive strain between the electro-conductive layer and the resinous layer increases, stress concentration increases at the interface between the resinous layer and the electro-conductive layer, and there is concern about the occurrence of buckling and the like. That is, it has been found that, if the difference in rigidity between the electro-conductive layer and the base member layer or between the electro-conductive layer and the resinous layer increases, durability problems arise where cracks occur along the electro-conductive layer.

Specific configurations of a fixing rotating member having an electro-conductive layer, a fixing device produced using the same, and an electrophotographic image forming device according to the present disclosure will be described below in detail.

However, sizes, materials, shapes and relative arrangements of components described in this aspect should be appropriately changed according to configurations of members to which the disclosure is applied and various conditions. That is, it is not intended to limit the scope of the disclosure to the following aspects. In addition, in the following description, configurations having the same functions will be denoted with the same reference numerals in the drawings and descriptions thereof may be omitted.

Electrophotographic Image Forming Device

An electrophotographic image forming device (hereinafter simply referred to as an "image forming device") comprises an image bearing member that carries a toner image, a transfer device that transfers a toner image to a recording material, and a fixing device that fixes the transferred toner image to the recording material.

Figure 2:
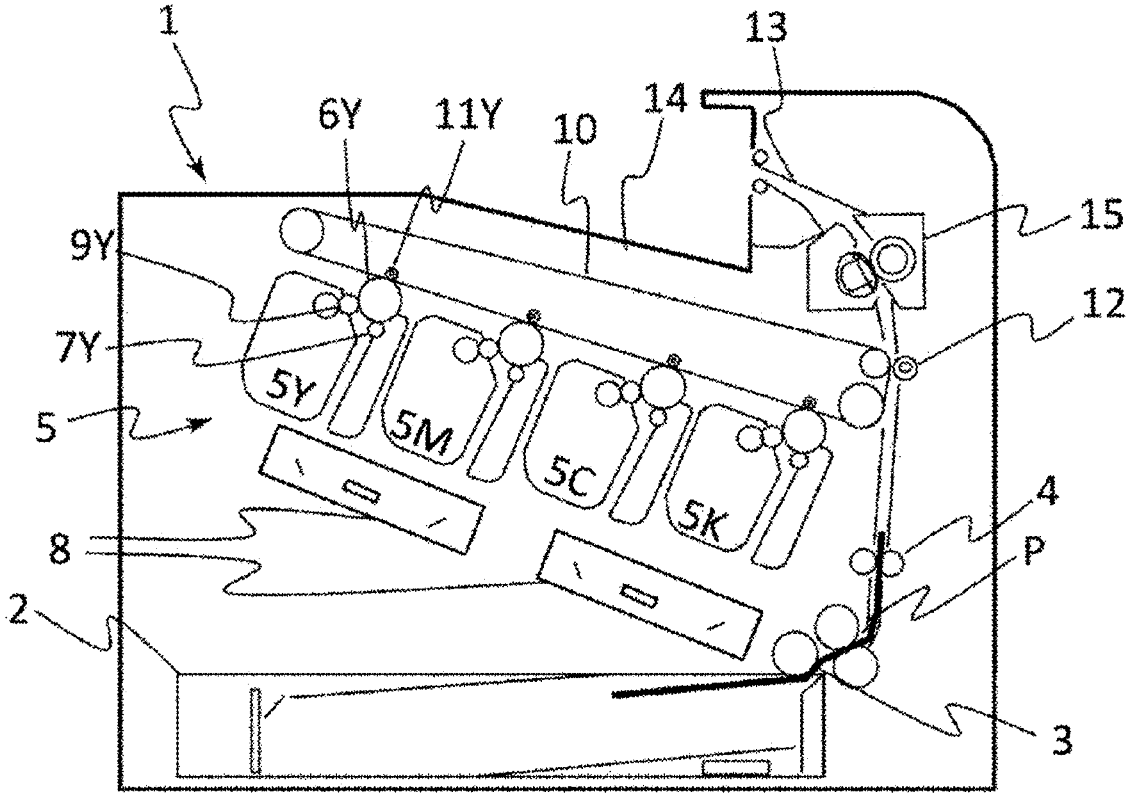
FIG. 2 is a schematic diagram of an electrophotographic image forming device according to an embodiment.

FIG. 2 is a transverse cross-sectional diagram showing an overall configuration of a color laser beam printer (hereinafter referred to as a printer) 1 as an example of an image forming device on which a fixing device (image heating device) 15 according to an embodiment is mounted.

A cassette 2 is accommodated in the lower part of the printer 1 such that it can be pulled out. The cassette 2 loads and accommodates a sheet P as a recording material. The sheets P in the cassette 2 are fed to a registration roller 4 while being separated one by one by a separation roller 3. Here, as the sheet P, which is a recording material, various sheets with different sizes and materials, for example, paper such as plain paper and thick paper, surface-treated sheet materials such as plastic films, cloth, and coated paper, and special-shaped sheet materials such as envelops and index paper can be used.

The printer 1 comprises an image forming unit 5 as an image forming means in which image forming units 5Y, 5M, 5C and 5K corresponding respectively to the colors yellow, magenta, cyan, and black are arranged in a horizontal row. In the image forming unit 5Y, a photosensitive drum 6Y as an image bearing member (electrophotographic photoreceptor) and a charging roller 7Y as a charging means that uniformly charges the surface of the photosensitive drum 6Y are provided. In addition, a scanner unit 8 is arranged below the image forming unit 5. The scanner unit 8 emits an on/off-modulated laser beam corresponding to a digital image signal that is input from an external device such as a computer (not shown) based on image information and is generated by an image processing means, and forms an electrostatic latent image on the photosensitive drum 6Y.

In addition, the image forming unit 5Y comprises a developing roller 9Y, which is a developing means for developing a toner image (toner picture) by attaching a toner to an electrostatic latent image on the photosensitive drum 6Y, and a primary transfer unit 11Y that transfers the toner image on the photosensitive drum 6Y to an intermediate transfer belt 10.

Toner images formed by the other image forming units 5M, 5C and 5K in the same process are also transferred to the toner image on the intermediate transfer belt 10 to which the toner image has been transferred by the primary transfer unit 11Y.

Accordingly, a full-color toner image is formed on the intermediate transfer belt 10. The full-color toner image is transferred onto the sheet P by a secondary transfer unit 12 as a transfer means. The primary transfer unit 11Y and the secondary transfer unit 12 are examples of a fixing device that fixes the transferred toner image to the recording material.

Then, the toner image transferred onto the sheet P (onto the recording material) passes through the fixing device 15 and is fixed as a fixed image. In addition, the sheet P passes through a discharge transport unit 13 and is discharged to and loaded on a loading unit 14.

Here, the image forming unit 5 is an example of the image forming means. While the primary transfer unit 11Y and the secondary transfer unit 12 are exemplified as the fixing device, the fixing device may be, for example, a direct transfer type fixing device that directly transfers the toner image from the image bearing member to the sheet P. In addition, the image forming device may have a monochrome type configuration using only one color toner.

Fixing Device

Figure 3:
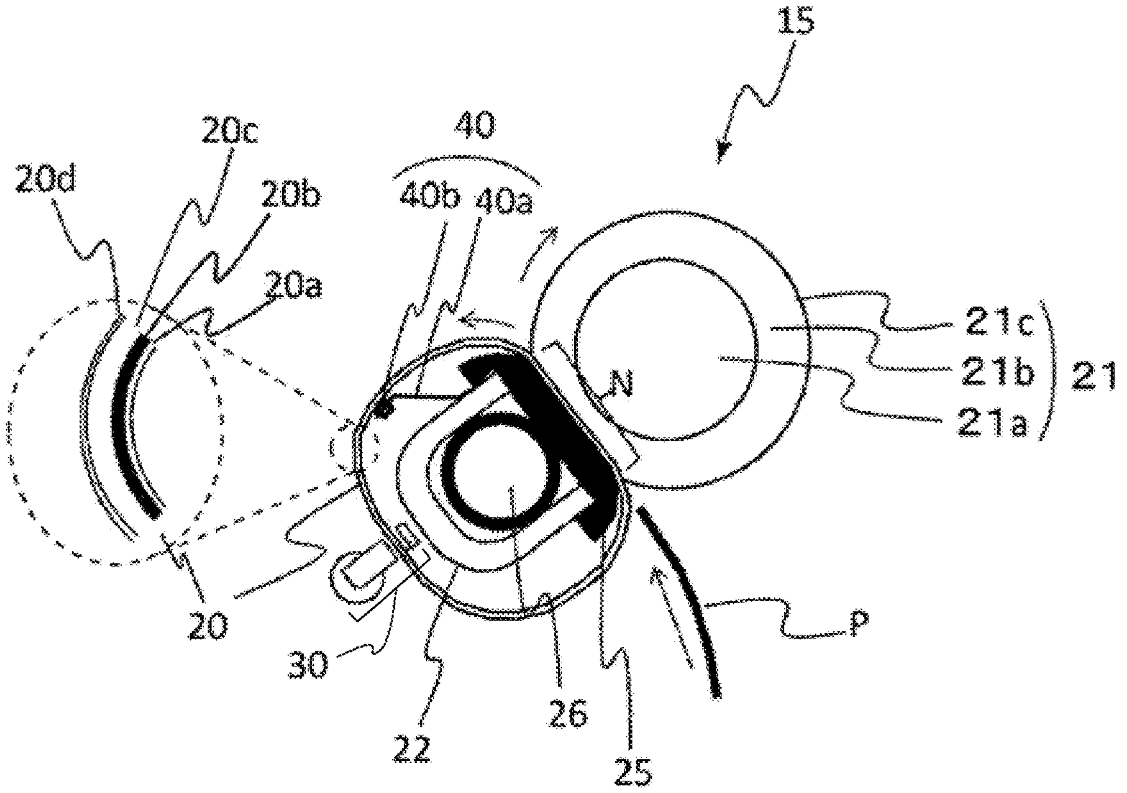
FIG. 3 is a schematic diagram showing a cross-sectional configuration of a fixing device according to an embodiment.
Figure 4:
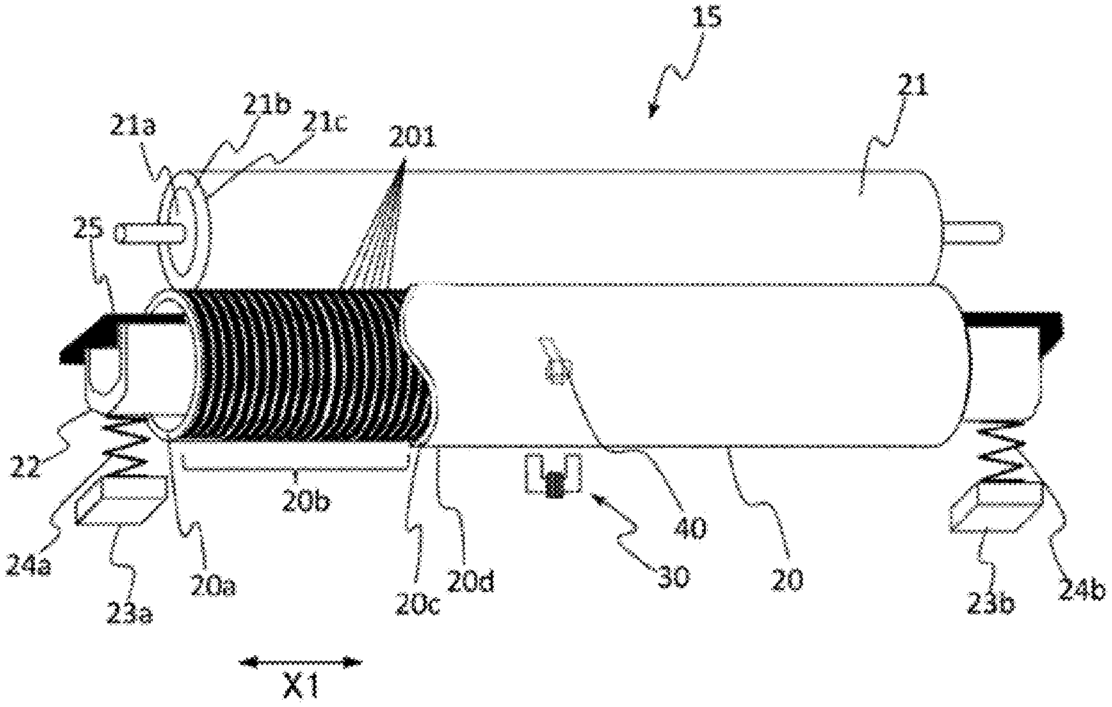
FIG. 4 is a perspective view showing a cross-sectional configuration of the fixing device according to the embodiment.

The fixing device 15 of the present embodiment is an induction heating type fixing device (image heating device) that heats the fixing rotating member according to electromagnetic induction. FIG. 3 shows a cross-sectional configuration of the fixing device 15, and FIG. 4 is a perspective view of the fixing device 15. Here, the housing and the like of the fixing device 15 are omitted in FIG. 3 and FIG. 4. In the following description, regarding the member constituting the fixing device 15, the longitudinal direction X1 is a direction orthogonal to the transport direction of the recording material and the thickness direction of the recording material, that is, the rotation axis direction of a fixing rotating member 20.

The fixing device 15 comprises the fixing rotating member 20, a film guide 25, a pressing roller 21, a pressing stay 22, a magnetic core 26, an excitation coil 27, a thermistor 40 and a current sensor 30. The fixing device 15 heats the recording material on which the image is formed and fixes the image to the recording material. The fixing rotating member 20 is a fixing rotating member of the present embodiment, and the pressing roller 21 is a counter member of the present embodiment. In addition, the excitation coil 27 functions as a magnetic field generation means of the present embodiment. Details of the fixing rotating member will be described below.

The fixing rotating member 20 comprises a base member 20*a*, an electro-conductive layer 20*b* on the outer surface of the base member 20_a_, and a resinous layer 20_e_ on the surface of the electro-conductive layer on opposite side to the side facing the base member.

The electro-conductive layer 20_b_ may be constituted by a plurality of electro-conductive areas 201 in a cross sectional view in a longitudinal direction perpendicular to a circumferential direction of the fixing rotating member, i.e. a direction along the rotational axis of the fixing rotating member as shown in FIG. 4. Each of the electro-conductive areas are elongated towards the circumferential direction of the fixing rotating member. That is, the electro-conductive layer 20_b_ may include the electro-conductive areas have ring-shape, which are electrically independent. Here, "electrically independent" means that each of the electro-conductive areas can generate heat by electromagnetic induction independently. Each of the electro-conductive areas 201 have preferably a uniform width in the longitudinal direction X1.

The pressing roller 21 is a counter member (pressing member) that faces the fixing rotating member 20 and comprises a core metal 21_a_ and an elastic layer 21_b_ that is concentrically and integrally molded and coated around the core metal in a roller shape, and a release layer 21_c_ is provided on the surface layer. The elastic layer 21_b_ is preferably made of a material having excellent heat resistance such as silicone rubber, fluoro rubber, or fluoro silicone rubber. Thus, both ends of the core metal 21_a_ in the longitudinal direction are freely rotatably held and arranged between sheet metals (not shown) on the chassis side of the fixing device via an electro-conductive bearing.

In addition, as shown in FIG. 4, when pressing springs 24_a_ and 24_b_ are compressively fitted between both ends of the pressing stay 22 in the longitudinal direction and spring receiving members 23_a_ and 23_b_ on the device chassis side, a downward force is applied to the pressing stay 22.

Here, in the fixing device 15 of the present embodiment, a pressing force with a total pressure of about 100 N to 300 N (about 10 kgf to about 30 kgf) is applied. Therefore, the lower surface of the film guide 25 made of a heat-resistant resin such as polyphenylene sulfide (PPS) and the upper surface of the pressing roller 21 are pressed against each other with the fixing rotating member 20, which is a cylindrical rotating member, therebetween to form a fixing nip part N having a predetermined width. The film guide 25 functions, together with the pressing roller 21, as a nip part forming member that forms a nip part for nipping and transporting the recording material carrying a toner image via the fixing rotating member 20.

The pressing roller 21 is driven to rotate clockwise by a drive means (not shown), and applies a counterclockwise rotational force to the fixing rotating member 20 according to friction with the outer surface of the fixing rotating member 20. Therefore, the fixing rotating member 20 rotates while sliding on the film guide 25.

Figure 5:
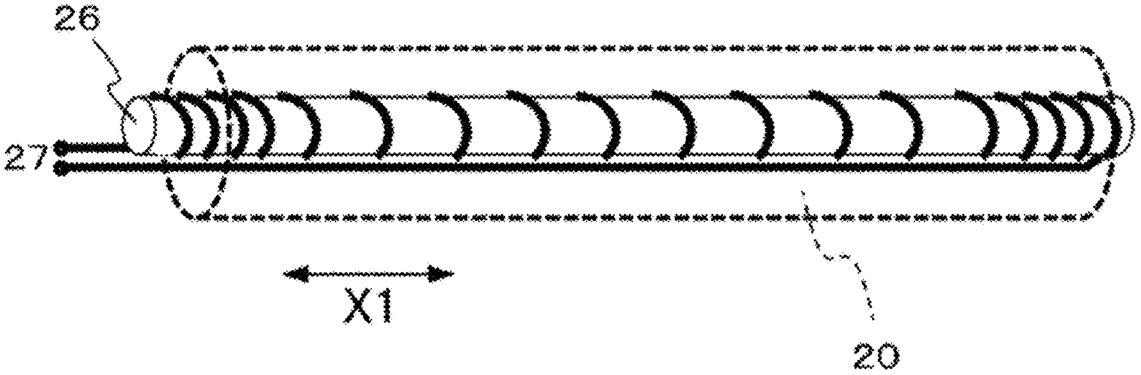
FIG. 5 is a pattern diagram of a magnetic core and an excitation coil of the fixing device according to the embodiment.

FIG. 5 is a pattern diagram of the magnetic core 26 and the excitation coil 27 shown in FIG. 3, and shows the fixing rotating member 20 with a dashed line in order to explain the positional relationship with the fixing rotating member 20. An induction heating device in an induction heating type fixing device that causes the fixing rotating member 20 to generate heat according to electromagnetic induction may comprise the magnetic core 26 and the excitation coil 27.

The excitation coil 27 is arranged inside the fixing rotating member 20. The excitation coil 27 has a helical part whose helical axis is substantially parallel to a direction along a rotation axis of the fixing rotating member 20 and generates an alternating magnetic field that causes the electro-conductive layer 20_b_ to generate heat by electromagnetic induction. "Substantially parallel" means not only that two axes are completely parallel but also that slight deviation is allowed to the extent that the electro-conductive layer can generate heat by electromagnetic induction.

The magnetic core 26 is arranged in the helical part, extends in the rotation axis direction of the fixing rotating member 20, and does not form a loop outside the fixing rotating member 20. The magnetic core 26 induces magnetic lines of force of an alternating magnetic field.

In FIG. 5, the magnetic core 26 is inserted into the hollow part of the fixing rotating member 20, which is a cylindrical rotating member. In addition, the excitation coil 27 is spirally wound around the outer circumference of the magnetic core 26 and extends in the longitudinal direction. The magnetic core 26 has a cylinder shape, and is fixed by a fixing means (not shown) so that it is positioned substantially at the center of the fixing rotating member 20 in a cross section viewed in the longitudinal direction (refer to FIG. 3).

The magnetic core 26 provided in the excitation coil 27 has a role of inducing magnetic lines of force (magnetic flux) of the alternating magnetic field generated from the excitation coil 27 inward from the electro-conductive layer 20_b_ of the fixing rotating member 20 and forming a path for magnetic lines of force (magnetic path). The material of the magnetic core 26 is a ferromagnet. The material of the magnetic core 26 as a ferromagnet is preferably a material having a small hysteresis loss and a high specific permeability, for example, at least one soft magnetic material having high permeability selected from the group consisting of sintered ferrite and ferrite resins.

Preferably, a shape in which 70% or more of the magnetic flux exit from one longitudinal end of the magnetic core 26 in the rotation axis direction passes through the outside of the electro-conductive layer 20_b_, and returns to the other longitudinal end of the magnetic core 26 is formed.

The cross-sectional shape of the magnetic core 26 may be any shape as long as it can be accommodated in the hollow part of the fixing rotating member 20, and although it is not necessarily circular, a shape that allows the cross-sectional area to be as large as possible is preferable. In the present embodiment, the magnetic core 26 has a diameter of 10 mm and a length of 280 mm in the longitudinal direction.

The excitation coil 27 is formed by spirally winding a copper wire (single conductor) coated with a heat-resistant polyamide imide and having a diameter of 1 to 2 mm around the magnetic core 26. The excitation coil 27 is wound around the outer circumference of the magnetic core 26 in a direction intersecting the rotation axis direction of the fixing rotating member 20. Therefore, when a high-frequency alternating current flows through the excitation coil 27, an alternating magnetic field is generated in a direction parallel to the rotation axis direction of the fixing rotating member 20, an induced current (circulating current) flows through each heat generation ring 201 of the electro-conductive layer 20_b_ of the fixing rotating member 20 according to the principle to be described below and heat is generated.

As shown in FIG. 3 and FIG. 4, the thermistor 40 as a temperature detection means that detects the temperature of the fixing rotating member 20 comprises a spring plate 40_a_ and a thermistor element 40_b_. The spring plate 40_a_ is a support member having spring elasticity which extends toward the inner surface of the fixing rotating member 20. The thermistor element 40_b_ as a temperature detection element is installed at the tip of the spring plate 40_a_. The surface of the thermistor element 40*b* is covered with a 50 μm-thick polyimide tape in order to secure electrical insulation.

The thermistor 40 is fixed to the film guide 25 and installed at a substantially central position of the fixing rotating member 20 in the longitudinal direction. The thermistor element 40*b* is pressed against the inner surface of the fixing rotating member 20 according to spring elasticity of the spring plate 40*a* and is held in a contact state. Here, the thermistor 40 may be arranged on the outer circumferential side of the fixing rotating member 20.

The current sensor 30 constituting a conduction monitoring device for monitoring conduction of the electro-conductive layer 20*b* in the circumferential direction is arranged at the same position as the thermistor 40 in the longitudinal direction of the fixing device 15. That is, the current sensor 30 monitors the conduction state of the heat generation ring 201 at a position where the thermistor element 40*b* is in contact among the plurality of heat generation rings 201 constituting the heat generation pattern of the fixing rotating member 20.

Heating Principle

The heating principle of the fixing rotating member 20 in the induction heating type fixing device 15 will be described.

Figure 6:
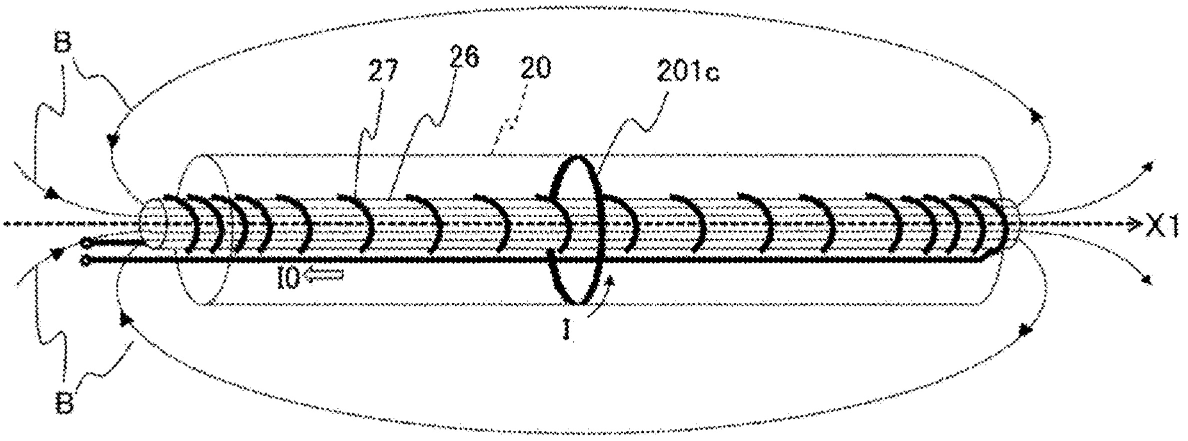
FIG. 6 is a diagram showing a magnetic field generated when a current flows through the excitation coil according to the embodiment.

FIG. 6 is a conceptual diagram showing a magnetic field generated when a current flows through the excitation coil 27 in the direction of an arrow I0. The excitation coil 27 is wound around the outer circumference of the magnetic core 26 inserted into the fixing rotating member 20, and functions as a magnetic field generation means in which, when an alternating current flows, an alternating magnetic field is generated in the rotation axis direction of the fixing rotating member 20 and an induced current I is generated in the circumferential direction of the fixing rotating member 20.

In addition, the magnetic core 26 functions as a member that induces magnetic lines of force B (dotted line in FIG. 6) generated by the excitation coil 27 and forms a magnetic path.

In a general induction heating type fixing device, magnetic lines of force pass through the electro-conductive layer and an eddy current is generated. On the other hand, in the present embodiment, the magnetic lines of force B are looped outside the fixing rotating member. That is, the electro-conductive layer 20*b* is mainly heated with an induced current induced by the magnetic lines of force that are output from one longitudinal end of the magnetic core 26, pass through the outside of the electro-conductive layer 20*b*, and return to the other longitudinal end of the magnetic core 26. Accordingly, heat can be efficiently generated even if the thickness of the electro-conductive layer is as thin as, for example, 4 μm or less.

When an alternating magnetic field is generated by the excitation coil 27, an induced current I flows through each heat generation ring 201 of the electro-conductive layer 20*b* of the fixing rotating member 20 according to the Faraday's law. Faraday's law indicates that "when a magnetic field in a circuit is changed, an induced electromotive force that causes a current to flow in the circuit is generated, and the induced electromotive force is proportional to the change in the magnetic flux over time which vertically penetrates the circuit."

Regarding a heat generation ring 201*c* positioned in the center part of the magnetic core 26 shown in FIG. 6 in the longitudinal direction, an induced current I that flows through the heat generation ring 201*c* when a high-frequency alternating current flows through the excitation coil 27 is considered. When a high-frequency alternating current flows, an alternating magnetic field is generated inside the magnetic core 26. In this case, an induced electromotive force applied to the heat generation ring 201*c* is proportional to a change in the magnetic flux over time, which vertically penetrates the inside of the heat generation ring 201*c* according to the following Numerical Expression 1.

$$V = -N\frac{\Delta\Phi}{\Delta t}$$

V: induced electromotive force

N: number of coil turns $\Delta\Phi/\Delta t$: change in the magnetic flux that vertically penetrates the circuit (the heat generation ring 201*c*) in a minute time $\Delta t$ Due to this induced electromotive force V, an induced current I, which is a circulating current that circulates in the heat generation ring 201*c*, flows, and the heat generation ring 201*c* generates heat due to Joule heat generated by the induced current I.

However, when the heat generation ring 201*c* is disconnected, the induced current I does not flow, and the heat generation ring 201*c* does not generate heat.

(1) Schematic Configuration of Fixing Rotating Member

Details of the fixing rotating member of the present embodiment will be described with reference to the drawings.

The fixing rotating member according to one aspect of the present disclosure may be, for example, a rotatable member such as an endless belt shape.

Figure 7:
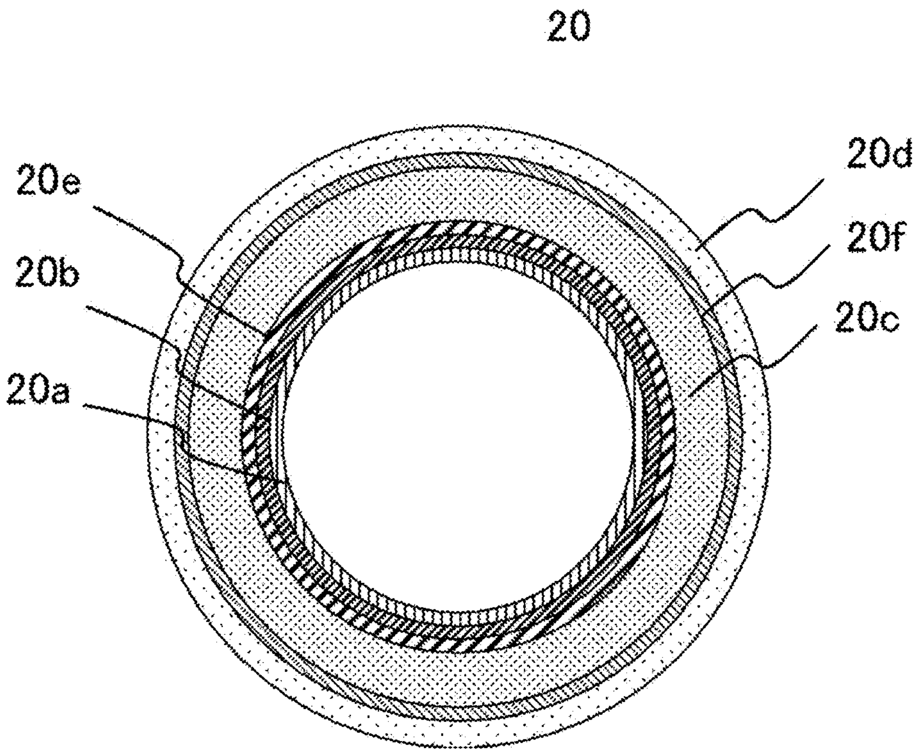
FIG. 7 is a cross-sectional configuration diagram of a fixing rotating member according to the embodiment.

FIG. 7 is a cross-sectional diagram of the fixing rotating member in the circumferential direction. The fixing rotating member comprises the cylindrical base member 20*a* comprising at least a resin, the electro-conductive layer 20*b* on the base member 20*a*, and the resinous layer 20*e* on the surface of the electro-conductive layer on opposite side to the side facing the base member. An elastic layer 20*c* and a surface layer (release layer) 20*d* may be provided on the resinous layer 20*e* as necessary, and an adhesive layer 20*f* may be provided between the elastic layer 20*c* and the surface layer 20*d*.

(2) Base Member

The material of the base member 20*a* is not particularly limited as long as it is a layer comprising at least a resin. That is, the base member 20*a* comprises a resin. When the belt is used in an electromagnetic induction type fixing device, the base member 20*a* may be a layer that maintains high strength with little change in physical properties when the electro-conductive layer is heated. Therefore, the base member 20*a* preferably comprises a heat-resistant resin as a main component, and is preferably formed of a heat-resistant resin. The heat-resistant resin is, for example, a resin that does not melt or decompose at a temperature of lower than 200° C. (preferably lower than 250° C.).

The resin comprised in the base member 20*a* (preferably, the resin constituting the base member) is preferably at least one selected from the group consisting of polyimide (PI), polyamide imide (PAI), modified polyimide and modified polyamide imide. At least one selected from the group consisting of polyimide and polyamide imide is more preferable. Among these, polyimide is particularly preferable. Here, in the present disclosure, the main component is a component whose content is the largest among components constituting an object (here, the base member).

Here, examples of modification for modified polyimide and modified polyamide imide include siloxane modification, carbonate modification, fluorine modification, urethane modification, triazine modification, and phenol modification.

In the fixing rotating member, the material of the base member 20*a* can be analyzed according to the following procedure.

A 10 mm square sample is cut out from the fixing rotating member, and if an elastic layer or a surface layer is provided, it is removed with a razor, a solvent or the like. When the obtained sample is subjected to total reflection (ATR) measurement using an infrared spectroscopic analysis device (FT-IR) (for example, product name: Frontier FT IR, commercially available from PerkinElmer Co., Ltd.), the material can be confirmed.

In addition, the material of the resinous layer to be described below can be analyzed by the same method as above.

A filler may be added to the base member 20*a* in order to improve heat insulation and strength.

The shape of the base member can be appropriately selected according to the shape of the fixing rotating member, and various shapes, for example, an endless belt shape, a hollow cylindrical shape, and a film shape, may be used.

The thickness of the base member 20*a* is, for example, preferably 10 to 100 μm and more preferably 20 to 60 μm. When the thickness of the base member 20*a* is set to be within the above range, both strength and flexibility can be achieved at high levels.

In addition, on the surface of the base member 20*a* on opposite side to the side facing the electro-conductive layer 20*b*, for example, a layer for preventing wear of the inner circumferential surface of the fixing belt when the inner circumferential surface of the fixing belt comes into contact with other members or a layer for improving slidability with respect to other members can also be provided.

Here, in order to improve adhesion and wettability with respect to the electro-conductive layer 20*b*, the outer circumferential surface of the base member 20*a* may be subjected to a roughening treatment such as blasting and a modification treatment such as ultraviolet rays, plasma, and chemical etching.

(3) Electro-Conductive Layer

The electro-conductive layer 20*b* is a layer that extends in the circumferential direction of the outer circumferential surface of the base member and generates heat during current application. In the principle of heat generation by induction heating using an excitation coil, when an alternating current is supplied to an excitation coil arranged near the fixing rotating member, a magnetic field is induced, and due to the magnetic field, an induced current flows through the electro-conductive layer 20*b* of the fixing rotating member, and heat is generated by Joule heat.

The material of the electro-conductive layer 20*b* is preferably silver because it has low volume resistivity and does not oxidize easily. The electro-conductive layer 20*b* comprises silver.

When the electro-conductive layer 20*b* comprises silver, it is possible to maintain conductivity required for the electro-conductive layer and it is possible to prevent the occurrence of image defects. In addition, it is possible to reduce deteriorate due to oxidation and it is possible to improve durability. The electro-conductive layer 20*b* may contain a metal other than silver so long as the effects of the present disclosure are not impaired thereby. However, the purity of the silver constituting at least a part of the electro-conductive layer 20*b* is preferably 90 mass % or higher, more preferably 99 mass % or higher, and particularly preferably 99.9 mass % or higher. The upper limit of silver content is not particularly restricted, but is, for example, the upper limit is 100 mass % or less.

In the fixing rotating member, the analysis of silver in the electro-conductive layer can, for example, be conducted according to the following procedure.

From the fixing rotating member, twenty (20) samples each having a length of 5 mm, a width of 5 mm and a thickness equal to the total thickness of the fixing rotating member are collected from arbitrary locations on the fixing rotating member. For the obtained 20 samples, a cross section of the fixing rotating member in the circumferential direction is exposed with a cross-section polisher (product name: SM09010, commercially available from JEOL Ltd.). Subsequently, the exposed cross section of the electro-conductive layer is observed under a scanning electron microscope (SEM) (product name: JSM-F100, commercially available from JEOL Ltd.) and silver crystalline particles in the observed image are subjected to energy dispersive X-ray spectroscopy (EDS) analysis. Observation conditions are a magnification of 20,000 and a secondary electron image acquisition mode, and EDS analysis conditions are an acceleration voltage of 5.0 kV and a working distance of 10 mm. The spatial range in which EDS analysis is performed is determined by area designation and adjusted so that only silver crystalline particles in the observed image are selected.

One image is acquired from one sample and EDS analysis is performed at three locations within one image. The contents of silver at a total of 60 locations in 20 samples are analyzed, an arithmetic average value thereof is calculated, and thus the content of silver in the fixing rotating member can be measured.

The maximum thickness of the electro-conductive layer 20*b* is preferably 4 μm or less. Within the above thickness, the fixing rotating member can have appropriate flexibility and the thermal capacity can be reduced.

In addition, when the maximum thickness is set to 4 μm or less, it is possible to further improve bending resistance performance. As shown in FIG. 3, the fixing rotating member 20 is driven to rotate while being pressed against the film guide 25 and the pressing roller 21. For each rotation, the fixing rotating member 20 is pressed and deformed at the fixing nip part N and receives stress. It is preferable to design the electro-conductive layer 20*b* of the fixing rotating member 20 so that fatigue fracture is not caused even if this repeated bending is continuously applied until the durable lifespan of the fixing device is reached.

When the thickness of the electro-conductive layer 20*b* is reduced, the resistance of the electro-conductive layer 20*b* to fatigue fracture is significantly improved. This is because, when the electro-conductive layer 20*b* is pressed and deformed along the shape of the curved surface of the film guide 25, the internal stress applied to the electro-conductive layer 20*b* is lower as the electro-conductive layer 20*b* is thinner. In addition, when the thickness of the electro-conductive layer is reduced, the time required for the electro-conductive layer to sufficiently generate heat can be further shortened.

For the above reason, the maximum thickness of the electro-conductive layer 20*b* is preferably 4 μm or less.

The maximum thickness of the electro-conductive layer is more preferably 3 μm or less. The lower limit value of the thickness of the electro-conductive layer is not particularly limited, and is preferably 1 μm or more in order to maintain durability. The maximum thickness of the electro-conductive layer is, for example, 1 to 4 μm, and particularly preferably in a range of 1 to 3 μm.

The maximum thickness of the electro-conductive layer in the fixing rotating member can be measured by the following method.

From the fixing rotating member, six samples each having a length of 5 mm, a width of 5 mm and a thickness equal to the total thickness of the fixing rotating member are collected from arbitrary locations on the fixing rotating member. For the obtained six samples, a cross section of the fixing rotating member in the circumferential direction is exposed with a cross-section polisher (product name: SM09010, commercially available from JEOL Ltd.).

Subsequently, the exposed cross section of the electro-conductive layer is observed under a scanning electron microscope (SEM) (product name: JSM-F100, commercially available from JEOL Ltd.) at an acceleration voltage of 3 kV, a working distance of 2.9 mm, and a magnification of 10,000 to obtain an image having a width of 13 μm and a height of 10 μm. Regarding the electro-conductive layer in the obtained image, parallel lines are drawn at the location closest to the base member side and the location closest to the resinous layer side opposite thereto, and the distance therebetween is taken as the thickness of the electro-conductive layer in the image, and the arithmetic average value of six samples is defined as the maximum thickness. Here, the parallel lines are drawn with reference to the surface of the base member opposite to the electro-conductive layer in the observation area.

The volume resistivity of the electro-conductive layer is $1.0\times10^{-8}$ to $8.0\times10^{-8}$ Ω·m. When the volume resistivity of the electro-conductive layer is set to be within the above range, it is possible to maintain conductivity required for the electro-conductive layer and it is possible to prevent the occurrence of image defects.

The volume resistivity of the electro-conductive layer is preferably $2.0\times10^{-8}$ Ω·m or more and more preferably $2.5\times10^{-8}$ Ω·m or less. In addition, $7.0\times10^{-8}$ Ω·m or less is preferable, and $6.0\times10^{-8}$ Ω·m or less is more preferable. For example, preferably, ranges of $2.0\times10^{-8}$ to $7.0\times10^{-8}$ Ω·m, and $2.0\times10^{-8}$ to $6.0\times10^{-8}$ Ω·m may be exemplified.

The volume resistivity of the electro-conductive layer can be controlled according to, for example, the material of the electro-conductive layer, the method of producing an electro-conductive layer or the like. Specifically, when silver is used as the material of the electro-conductive layer, it is possible to increase the volume resistivity. In addition, specifically, for example, when the electro-conductive layer is formed using a silver nano ink, an electro-conductive layer having lower volume resistivity can be obtained as the firing temperature of the coating of the silver nano ink formed on the surface of the base member is higher. This is because the organic material such as a dispersant contained in the silver nano ink evaporates in a firing process at a high temperature, and an electro-conductive layer with a small content of components other than silver can be formed.

The volume resistivity of the electro-conductive layer can be measured, for example, according to resistance measurement using a 4-point probe method (JIS K 7194).

In the present disclosure, using a Low Resistivity Meter (Loresta GX MCP-T700, commercially available from Nittoseiko Analytech Co., Ltd.), the volume resistivity is measured according to JIS K 7194:1994. Specifically, the volume resistivity is measured by the following method.

The surface layer and the elastic layer are peeled off from the fixing rotating member, and a laminate of the base layer, the electro-conductive layer, and the resinous layer is taken out. Next, the base layer and the resinous layer are removed with a solvent (e Solve 21KZE-100, commercially available from Kaneko Chemical Co., Ltd.) to obtain an electro-conductive layer. The volume resistance value is measured by bringing the measurement probe of the above device into direct contact with the obtained conductive layer. The probe to be used may be selected according to the width of the electro-conductive layer. For example, if the width of the electro-conductive layer is 200 μm, a probe with an electrode diameter of 150 μm is selected. For the resistance value of the electro-conductive layer, the resistance values of a plurality of conductive layers are measured, and the average value thereof is used as the volume resistivity of the electro-conductive layer of the member.

As described above, in the cross sectional view in the longitudinal direction orthogonal to the circumferential direction of the fixing rotational member, the electro-conductive layer 20*b* may be constituted by a plurality of ring-shaped electro-conductive areas 201 which are electrically independent of each other (see FIG. 4). By adopting such a configuration, even if one of the electro-conductive areas 201 is cracked and heat generation becomes difficult in the cracked electro-conductive area, the heat generation ability of the entire electro-conductive layer 20*b* is not greatly affected.

In this connection, when the aforementioned configuration is employed, since the whole surface area of the electro-conductive layer 20*b* increases, it is considered that the electro-conductive layer is oxidated. However, by employing silver as a material for the electro-conductive layer, deterioration due to oxidation of the electro-conductive layer can be effectively suppressed.

As shown in FIG. 4, when the electro-conductive layer 20*b* is constituted by a plurality of ring shaped electro-conductive areas 201, the width of the electro-conductive areas in the cross sectional view in the longitudinal direction of the fixing rotating member, may preferably be 100 μm or more and more preferably 200 μm or more in consideration of superior heat generating ability. Further, in consideration of prevention of uneven heat generation, the width of each of the electro-conductive areas 201 may preferably be 500 μm or less and more preferably 400 μm or less. The width of each of the electro-conductive areas may preferably be, for example, 100 to 500 μm, and more preferably be 200 to 400 μm. In addition, for the width of the each of the electro-conductive areas may preferably be substantially constant. Further, the distance between the electro-conductive areas constituting the electro-conductive layer 20*b* is preferably 50 μm or more, and more preferably 100 μm or more, from the viewpoint of preventing a short circuit between the electro-conductive areas. Further, from the viewpoint of suppressing the heat generation unevenness of the fixing rotating member, the distance between the electro-conductive areas may preferably be 400 μm or less and more preferably be 300 μm or less. The distance may preferably be, for example, 50~400 μm, and more preferably be 100~300 μm.

For the electro-conductive layer 20*b*, it is desirable that the difference between the compressive elastic modulus in the compression direction and the compressive elastic modulus of the base member and the resinous layer be small. If the difference in compressive elastic modulus between the base member or the resinous layer and the electro-conductive layer is small, when the end of the paper, a so-called paper edge, is locally compressed and deformed, it is possible to prevent excessive stress from being applied at the interface between the electro-conductive layer and the base member or the resinous layer. The base member is preferably formed of a heat-resistant resin as a main component as described above. Therefore, it is desirable that the compressive elastic modulus of the electro-conductive layer 20*b* be as low as possible even though silver is the main component.

The electroconductive layer has a compressive elastic modulus of 8 to 30 GPa. The compressive elastic modulus is measured by contacting a Berkovich type indenter with a first surface of the electroconductive layer opposite to a surface facing the base member, and then indenting into the electro-conducive layer in a depth of 1 μm from the first surface of the electroconductive layer to measure a compressive elastic modulus at each depth position. Then average value of elastic moduli at a depth region of 10 to 20% with respect to the indented depth of 1 μm from the first surface, i.e. a depth region ranging from a depth of 0.1 μm to 0.2 μm from the first surface is calculated. The obtained average value is taken as a compressive elastic modulus of the electro-conductive layer.

The compressive elastic modulus of the electro-conductive layer is more preferably 25 GPa or less and still more preferably 20 GPa or less. In consideration of durability of the electro-conductive layer, the lower limit of the compressive elastic modulus is 8 GPa or more. The compressive elastic modulus of the elastic layer may, for example, preferably be in the range of 8 to 25 GPa, and more preferably be 8 to 20 GPa.

When the compressive elastic modulus of the electro-conductive layer is set to be within the above range, it is possible to reduce the difference from the compressive elastic modulus of the resin material used for the base member. As a result, it is possible to prevent excessive stress from being applied at the interface between the electro-conductive layer and the base member or the resin constituting the resinous layer and it is possible to improve durability.

The compressive elastic modulus of the electro-conductive layer is preferably within 6 times the compressive elastic modulus of the base member. The compressive elastic modulus of the base member is measured in the same manner as that of the elastic layer.

Specifically, the Berkovich type indenter is indented into the base member at a position of 1 μm in depth from a first surface of the base member opposite to a surface on which the electro-conductive layer is formed, and the compressive elastic modulus at each depth position is measured. The average value of the compressive elastic modulus in the thickness range of 0.1 to 0.2 μm from the first surface of the base member is taken as the compressive elastic modulus of the base member. As to the base member that has a thickness of 40 μm, and is constituted by polyimide, which is exemplified as a preferable material, the compressive elastic modulus is, for example, 5 GPa. Therefore, as the compressive elastic modulus of the electro-conductive layer on the polyimide base member made of polyimide, may preferable be 6 times or less of the compressive elastic modules of the base member, i.e., 30 GPa or less. Here, the compressive elastic modulus of a resinous base member, may preferably be 2.5 to 6.0 GPa.

Reducing the compressive elastic modulus while maintaining conductivity required for the electro-conductive layer can be achieved by forming pores in the electro-conductive layer. When the electro-conductive layer has pores, the electro-conductive layer can also deform by conforming to deformation of the resin constituting the base member and the resinous layer upon receiving local compressive stress and can receive excessive stress. As a result, it is possible to reduce the occurrence of cracks and it is possible to improve durability of the electro-conductive layer.

The compressive elastic modulus of the electro-conductive layer can be kept low as the size and proportion of pores in the electro-conductive layer increase. However, if the porosity of the electro-conductive layer is too large, problems may occur in conductivity and durability. Therefore, it is desirable to adjust the size and proportion of pores so that the compressive elastic modulus of the electro-conductive layer does not fall below 8 GPa.

A method of forming pores in the electro-conductive layer 20*b* is not particularly limited, and for example, a method of forming a pattern on the electro-conductive layer 20*b* according to a photolithographic process and then forming pores by chemical etching and a method of forming pores using a laser or focused ion beam may be exemplified. In the present disclosure, particularly, pore formation using a silver nanoparticle material will be described.

Figure 8A:
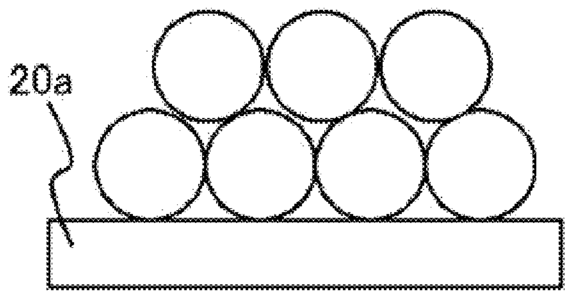
FIGS. 8A to 8C show pattern diagrams showing a mechanism by which pores penetrating the electro-conductive layer of the fixing rotating member according to the embodiment in the thickness direction are formed.
Figure 8B:
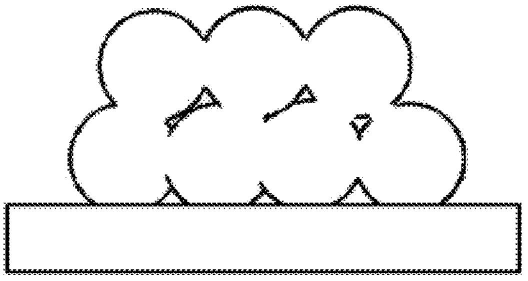

First, a film of a paint obtained by adding silver nanoparticles with a particle size of about 10 to 50 nm is formed. Therefore, as shown in FIG. 8A, particles are laminated. Due to instability of the surface energy of silver nanoparticles, the silver nanoparticles are fused together by firing at a low temperature of about 100° C., and as shown in FIG. 8B, a coating having nano-sized pores can be obtained. The electro-conductive layer 20*b* is preferably a silver nanoparticle sintered body.

Figure 8C:
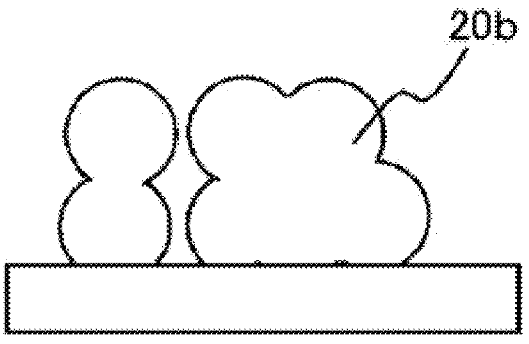

In addition, when a laminate in which a silver nanoparticle film is formed is fired (sintered) at 300° C. to 400° C., the nano-sized pores in the coating are combined to form large pores, and eventually, through-holes that are open on both the surface on the side of the base member and the surface opposite to the surface on the side of the base member are formed as shown in FIG. 8C. That is, when an electro-conductive layer is formed using a silver nano ink, the number of pores and the size of pores can be adjusted by increasing the firing temperature of a silver nano ink layer formed on the surface of the base member and by lengthening the firing time.

The size and number of pores in the electro-conductive layer can be expressed as porosity. Here, the porosity in the electro-conductive layer is obtained as follows.

Production of Evaluation Sample

First, an evaluation sample is produced. From the fixing rotating member, one sample having a length of 5 mm, a width of 5 mm and a thickness equal to the total thickness of the fixing rotating member is collected from an arbitrary location on the fixing rotating member.

For the obtained sample, a cross section of the fixing rotating member in the circumferential direction is polished using an ion beam. In this case, the processing position is adjusted so that the cross section of the electro-conductive layer in the circumferential direction is exposed by ion beam polishing. The method of polishing the cross section with an ion beam is not particularly limited, but in the present disclosure, a cross-section polisher is used. According to polishing of the cross section with an ion beam, it is possible to prevent the filler from falling off of the sample and the abrasive from being mixed in and it is possible to form a cross section with few polishing marks.

Cross Section Observation of Electro-Conductive Layer and Image Processing

The cross section of the electro-conductive layer obtained by the aforementioned method is observed under a scanning electron microscope (SEM) (product name: JSM-F100, commercially available from JEOL Ltd.) and a cross-sectional image (SEM image) is acquired. Observation conditions are a backscattered electron image mode at a magnification of 20,000 and reflection electron image acquisition conditions are an acceleration voltage of 3.0 kV, and a working distance of 3 mm. One example of the SEM image of the fixing rotating member 100 is shown in FIG. 1. In FIG. 1, the fixing rotating member 100 comprises a base member 101, an electro-conductive layer 103 on the base member 101, and a resinous layer 105 on the electro-conductive layer 103. The electro-conductive layer exemplified in FIG. 1 contains crystals of silver 103-1, and at least one pore 107 is contained in the exemplified electro-conductive layer 103.

Binarization processing is performed on the cut image so that crystalline particles are displayed in white and parts other than crystalline particles are displayed in black. As a method of binarization, for example, an Otsu's method disclosed in IEEE Transactions on SYSTEMS, MAN, AND CYBERNETICS, Vol. SMC-9, No. 1, January 1979, pp. 62-66, can be used.

Specifically, first, a reflection electron image is read using image analysis software (ImageProPlus, commercially available from MediaCybernetics), an image is cut out in a size range of 0.5 μm×0.5 μm at an arbitrary location, and the brightness distribution of the image is obtained. Next, when a brightness range of the obtained brightness distribution is set, it is possible to perform binarization in which crystalline particles and parts other than crystalline particles can be distinguished.

Calculation of Porosity

In the binarized image acquired in the procedure, metal crystal particles are expressed as a white area. The porosity is calculated by calculating the area occupied by these crystalline particles in the image.

Specifically, in the binarized image, the number of pixels composed of crystalline particles is calculated, and a total number of pixels is calculated. The area occupied by crystalline particles can be calculated by multiplying the total number of pixels by the area of one pixel (0.15×0.15=0.0225 $\mu m^2$).

Since the porosity indicates a proportion of spaces not occupied by crystalline particles in the electro-conductive layer, it is determined as follows using the area occupied by crystalline particles obtained above.

$$\text{porosity}=\{\text{area of binarized image } (0.5\times0.5(\mu m^2))-\text{area occupied by crystalline particles } (\mu m^2)\}/\text{area of binarized image } (0.5\times0.5(\mu m^2))\times100$$

The average porosity obtained by averaging the porosities obtained at 20 arbitrary locations in the binarized image of the cross section of the electro-conductive layer is used as the porosity of the electro-conductive layer.

The porosity of the electro-conductive layer is preferably 15% or more, more preferably 20% or more, and still more preferably 25% or more. Within the above range, the compressive elastic modulus can be reduced while maintaining conductivity required for the electro-conductive layer.

In consideration of conductivity and durability, the upper limit of the porosity of the conductive layer is preferably 50% or less, more preferably 48% or less, and still more preferably 45% or less. Within the above range, it is possible to achieve both conductivity and durability. For example, preferably, ranges of 15 to 50%, 20 to 48%, and 25 to 45% may be exemplified.

When a silver nanoparticle material is used to form pores according to the above method, the porosity can be controlled according to the firing temperature when the electro-conductive layer is formed. Specifically, if the firing temperature is higher, since fusion of silver nanoparticles is promoted, the porosity is larger.

The firing temperature of the electro-conductive layer is preferably 100° C. or higher and more preferably 150° C. or higher. Within the above range, it is possible to form a sufficient amount of pores for improving durability.

In addition, the firing temperature of the electro-conductive layer is preferably 400° C. or lower and preferably 350° C. or lower. Within the above range, the porosity does not become too large, and the conductivity and durability of the electro-conductive layer can be maintained. For example, preferably, ranges of 100 to 400° C. and 150 to 350° C. may be exemplified.

The firing time of the electro-conductive layer is not particularly limited, and, for example, a range of 10 to 120 minutes may be exemplified.

(4) Resinous Layer

The fixing rotating member has the resinous layer **20*e* on the surface of the electro-conductive layer on opposite side to the side facing the base member. The resinous layer 20*e* protects the electro-conductive layer 20*b*, and has functions of preventing oxidation of the electro-conductive layer 20*b***, securing insulation, and improving strength.

The resin constituting the resinous layer **20*e* is not particularly limited. Like the resin of the base member 20*a*, the resin used in the resinous layer 20*e* is preferably a resin that has little physical property changes when the electro-conductive layer 20*b* generates heat and can maintain high strength. Therefore, the resinous layer 20*e*** preferably comprises a heat-resistant resin as a main component and is preferably formed of a heat-resistant resin. The heat-resistant resin is, for example, a resin that does not melt or decompose at a temperature of lower than 200° C. (preferably lower than 250° C.).

The resin constituting the resinous layer **20*e* preferably comprises at least one selected from the group consisting of polyimide (PI), polyamide imide (PAI), modified polyimide and modified polyamide imide, and more preferably comprises at least one selected from the group consisting of polyimide and polyamide imide. Regarding modifications, those described in the base member 20*a* are similarly applied. The method of forming the base member 20*a* and the resinous layer 20*e*** is not particularly limited. For example, an imide material in a liquid form called a varnish can be applied using a known method and fired to form a coating.

The material of the resinous layer can be analyzed by the same method as in the analysis of the material for the base member.

In consideration of heat transfer, the resinous layer **20*e* may comprise a thermally conductive filler. When heat transfer is improved, heat generated in the electro-conductive layer 20*b*** can be efficiently transferred to the outer surface of the fixing rotating member.

The thickness of the resinous layer **20*e* is preferably 10 to 100 μm and more preferably 20 to 60 μm. In consideration of bending resistance of the electro-conductive layer 20*b*, the thickness of the resinous layer 20*e* is preferably the same as the thickness of the base member 20*a*. For example, the ratio of the difference in thickness between the base member and the resinous layer to the thickness of the base member is preferably 20% or less, 10% or less, or 5% or less. This is because, with the reduced difference in thickness, when the nip part is repeatedly bent, the stress applied to the electro-conductive layer 20***b* is evenly distributed, and it is possible to reduce the occurrence of cracks in the electro-conductive layer 20*b*.

(5) Elastic Layer

The fixing rotating member may have, as necessary, an elastic layer on the outer surface of the resinous layer 20*e*. The elastic layer 20*c* is a layer for imparting flexibility to the fixing rotating member in order to secure the fixing nip in the fixing device. Here, when the fixing rotating member is used as a heating member that comes into contact with the toner on paper, the elastic layer 20*c* also functions as a layer for imparting flexibility to the surface of the heating member so that it can conform to the unevenness of paper.

The elastic layer 20*c* comprises, for example, rubber as a matrix and particles dispersed in the rubber. More specifically, the elastic layer 20*c* preferably comprises rubber and a thermally conductive filler, and is preferably formed of a cured material obtained by curing a composition comprising at least a rubber raw material (a base polymer, a cross-linking agent, etc.) and a thermally conductive filler.

In order to exhibit functions of the elastic layer 20*c* described above, the elastic layer 20*c* is preferably formed of a silicone rubber cured material comprising thermally conductive particles and more preferably formed of a cured material of an addition-curable silicone rubber composition.

The silicone rubber composition may comprise, for example, thermally conductive particles, a base polymer, a cross-linking agent and a catalyst, and as necessary, an additive. Since most silicone rubber compositions are a liquid, the thermally conductive filler is easily dispersed, and if the degree of cross-linking is adjusted according to the type and amount of thermally conductive filler added, it is easy to adjust elasticity of the elastic layer 20*c* to be produced.

The matrix has a function of exhibiting elasticity in the elastic layer 20*c*. The matrix preferably comprises silicone rubber in order to exhibit functions of the elastic layer 20*c* described above.

Silicone rubber is preferable because it has high heat resistance so that flexibility can be maintained even in an environment where the non-paper-passing area reaches a high temperature of about 240° C. As the silicone rubber, for example, a cured material of an addition-curable liquid silicone rubber composition to be described below can be used. The elastic layer 20*c* can be formed by applying and heating a liquid silicone rubber composition by a known method.

The liquid silicone rubber composition comprises generally the following components (a) to (d).

Component (a): organopolysiloxane having an unsaturated aliphatic group;

Component (b): organopolysiloxane having active hydrogen bonded to silicon;

Component (c): catalyst;

Component (d): thermally conductive filler

Hereinafter, respective components will be described.

Component (a)

Examples of organopolysiloxanes having an unsaturated aliphatic group include organopolysiloxanes having an unsaturated aliphatic group such as a vinyl group. Examples thereof include those represented by the following Formula (1) and Formula (2).

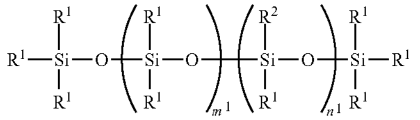

(1)

In Formula (1), $m^1$ represents an integer of 0 or more and $n^1$ represents an integer of 3 or more. $R^1$'s each independently represent a monovalent unsubstituted or substituted hydrocarbon group containing no unsaturated aliphatic group, and at least one of $R^1$'s represents a methyl group. $R^2$'s each independently represent an unsaturated aliphatic group.

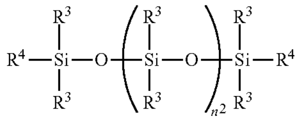

(2)

In Formula (2), $n^2$ represents a positive integer. $R^3$'s each independently represent a monovalent unsubstituted or substituted hydrocarbon group containing no unsaturated aliphatic group, and at least one of $R^3$'s represents a methyl group. $R^4$'s each independently represent an unsaturated aliphatic group.

Examples of monovalent unsubstituted or substituted hydrocarbon groups containing no unsaturated aliphatic group that can be represented by $R^1$ and $R^3$ in Formula (1) and Formula (2) include the following groups.

Unsubstituted hydrocarbon group alkyl group (for example, methyl group, ethyl group, propyl group, butyl group, pentyl group, hexyl group). Aryl groups (for example, phenyl group).

Substituted hydrocarbon group substituted alkyl group (for example, chloromethyl group, 3-chloropropyl group, 3,3,3-trifluoropropyl group, 3-cyanopropyl group, 3-methoxypropyl group).

Organopolysiloxanes represented by Formula (1) and Formula (2) have at least one methyl group directly bonded to a silicon atom that forms a chain structure. However, in consideration of ease of synthesis and handling, 50% or more of each of $R^1$ and $R^3$ is preferably a methyl group and all $R^1$ and $R^3$ are more preferably a methyl group.

In addition, examples of unsaturated aliphatic groups that can be represented by $R^2$ and $R^4$ in Formula (1) and Formula (2) include a vinyl group, allyl group, 3-butenyl group, 4-pentenyl group, and 5-hexenyl group. Among these groups, both $R^2$ and $R^4$ are preferably a vinyl group because they are easy to synthesize and handle and are inexpensive, and easily undergo a cross-linking reaction.

In consideration of moldability, the viscosity of the component (a) is preferably 1,000 to 50,000 $mm^2/s$. If the viscosity (dynamic viscosity) is lower than 1,000 $mm^2/s$, it becomes difficult to adjust the hardness to the hardness required for the elastic layer 20*c*, and if the viscosity is higher than 50,000 $mm^2/s$, the viscosity of the composition becomes too high and coating becomes difficult. The viscosity (dynamic viscosity) can be measured using a capillary viscometer, a rotational viscometer or the like based on JIS Z 8803:2011.

The amount of the component (a) added based on the liquid silicone rubber composition used for forming the elastic layer 20*c* is preferably 55 volume % or more in consideration of durability and 65 volume % or less in consideration of heat transfer.

Component (b)

The organopolysiloxane having active hydrogen bonded to silicon functions as a cross-linking agent that reacts with the unsaturated aliphatic group of the component (a) under an action of a catalyst to form a cured silicone rubber.

As the component (b), any organopolysiloxane having Si—H bonds can be used. Particularly, in consideration of the reactivity with the unsaturated aliphatic group of the component (a), those having an average of 3 or more hydrogen atoms bonded to a silicon atom in one molecule are preferably used.

Specific examples of components (b) include linear organopolysiloxanes represented by the following Formula (3) and cyclic organopolysiloxanes represented by the following Formula (4).

(3)

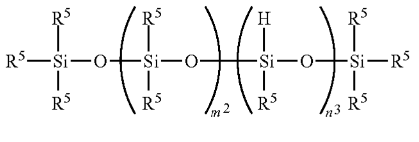

In Formula (3), $m^2$ represents an integer of 0 or more and $n^3$ represents an integer of 3 or more. $R^5$'s each independently represent a monovalent unsubstituted or substituted hydrocarbon group containing no unsaturated aliphatic group.

(4)

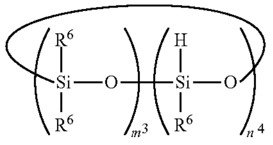

In Formula (4), $m^3$ represents an integer of 0 or more and $n^4$ represents an integer of 3 or more. $R^6$'s each independently represent a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in Formula (3) and Formula (4) include the same groups as $R^1$ in Formula (1) described above. Among these, 50% or more of each of $R^5$ and $R^6$ is preferably a methyl group and all $R^5$ and $R^6$ are more preferably a methyl group because they are easy to synthesize and handle and excellent heat resistance is easily obtained.

Component (c)

Examples of catalysts used for forming silicone rubber include a hydrosilylation catalyst for promoting the curing reaction. As the hydrosilylation catalyst, for example, known substances such as a platinum compound and a rhodium compound can be used. The amount of the catalyst added can be appropriately set and is not particularly limited.

Component (d)

Examples of thermally conductive fillers include metals, metal compounds, and carbon fibers. Highly thermally conductive fillers are more preferable, and specific examples thereof include the following materials.

Metallic silicon (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor-grown carbon fibers, PAN (polyacrylonitrile)-based carbon fibers, pitch-based carbon fibers.

These fillers may be used alone or two or more thereof may be used in combination.

In consideration of handling and dispersibility, the average particle size of the filler is preferably 1 to 50 μm. In addition, as the shape of the filler, spherical, pulverized, acicular, plate-like, and whisker-like shapes are used.

Particularly, in consideration of dispersibility, the filler is preferably spherical. In addition, at least one of reinforcing fillers, heat-resistant fillers and colored fillers may be added.

(6) Adhesive Layer

The fixing rotating member may have the adhesive layer 20*f* for adhering the surface layer 20*d* to be described below on the outer surface of the elastic layer 20*c*.

The adhesive layer 20*f* is a layer for adhering the elastic layer 20*c* and the surface layer 20*d*. The adhesive used in the adhesive layer 20*f* is not particularly limited and any appropriately selected from among known adhesives is used. However, in consideration of ease of handling, it is preferable to use an addition-curable silicone rubber to which a self-adhesive component is added.

The adhesive used for the adhesive layer f may comprise, for example, a self-adhesive component, an organopolysiloxane having a plurality of unsaturated aliphatic groups represented by vinyl groups in the molecular chain, a hydrogen organopolysiloxane, and a platinum compound as a cross-linking catalyst. When the adhesive applied to the surface of the elastic layer 20*c* is cured according to an addition reaction, the adhesive layer 20*f* that causes the surface layer 20*d* to be adhered to the elastic layer 20*c* can be formed.

Examples of self-adhesive components include the following components. Silanes having at least one, and preferably 2 or more functional groups selected from the group consisting of alkenyl groups such as a vinyl group, a (meth)acryloxy group, a hydrosilyl group (SiH group), an epoxy group, an alkoxysilyl group, a carbonyl group, and a phenyl group.

- Organosilicon compounds such as cyclic or linear siloxanes having from 2 to 30 silicon atoms, and preferably from 4 to 20 silicon atoms.
- Non-silicon (that is, comprising no silicon atoms in the molecule) organic compounds that may comprise oxygen atoms in the molecule. However, compounds comprise from 1 to 4 and preferably from 1 to 2 aromatic rings such as a phenylene structure with a valency of from 1 to 4 and preferably from 2 to 4 in one molecule. In addition, compounds comprise at least one, and preferably, from 2 to 4 functional groups (for example, alkenyl group, (meth)acryloxy group) that can contribute to a hydrosilylation addition reaction in one molecule.

The self-adhesive components may be used alone or two or more thereof may be used in combination. In addition, in order to adjust viscosity and secure heat resistance, a filler component can be added to the adhesive within the scope of the gist of the present disclosure. Examples of filler components include the following components.

Silica, alumina, iron oxide, cerium oxide, cerium hydroxide, carbon black, etc.

The addition amount of each component comprised in the adhesive is not particularly limited and can be appropriately set. Such addition-curable silicone rubber adhesives are commercially available and easily obtainable. The thickness of the adhesive layer is preferably 20 μm or less. If the thickness of the adhesive layer **20*f*** is set to 20 μm or less, when the fixing belt according to this aspect is used as a heating belt in a thermal fixing device, heat resistance can be easily set to be small and heat from the inner surface can be easily efficiently transferred to a recording medium.

(7) Surface Layer

The fixing rotating member may have, as necessary, the surface layer **20*d***.

The surface layer preferably comprises a fluororesin in order to exhibit a function as a release layer that prevents the toner from attaching to the outer surface of the fixing rotating member. The surface layer may be formed using, for example, a resin exemplified below that is molded into a tube, or may be molded by coating with a resin dispersion liquid.

Tetrafluoroethylene-perfluoro (alkyl vinyl ether) copolymers (PFA), polytetrafluoroethylene (PTFE), tetrafluoroethylene-hexafluoropropylene copolymers (FEP), etc.

Among the resin materials exemplified above, PFA is particularly preferably used in consideration of moldability and toner releasability.

The thickness of the surface layer **20*d* is preferably 10 to 50 μm. When the thickness of the surface layer 20*d*** is set to be within the above range, it is easy to maintain an appropriate surface hardness of the fixing rotating member.

According to one aspect of the present disclosure, a fixing device in which the fixing rotating member is arranged is provided. Therefore, it is possible to provide a fixing device in which a fixing rotating member having high conductivity and excellent durability is arranged. In addition, it is possible to provide an image forming device using the fixing device.

(8) Method of Producing Fixing Rotating Member

A non-limiting production method for a fixing rotating member (a pressing belt or a pressing roller) which comprises a base member, an electro-conductive layer on the base member and a resinous layer on the surface of the electro-conductive layer opposite to the side that faces the base member and in which the electro-conductive layer comprises silver according to one aspect of the present disclosure is exemplified. Examples of production methods using a silver nanoparticle material comprise a method comprising the following steps (i) to (iii).

(i) a step of obtaining the base member;

(ii) a step of obtaining an electro-conductive layer by applying a silver nanoparticle ink onto the outer circumferential surface of the base member obtained in the step (i) and performing firing; and (iii) a step of obtaining a resinous layer by applying a resin material onto the electro-conductive layer obtained in the step (ii) and performing firing.

EXAMPLES

The present disclosure will be described in more detail hereinbelow with reference to Examples and Comparative Examples, but the present disclosure is not limited thereto.

Example 1

A cylindrical stainless steel mold with an outer diameter of 30 mm and a length of 460 mm in the longitudinal direction orthogonal to the circumferential direction of the mold, was provided. The outer peripheral surface of the mold was subjected to a release treatment. Then the mold was totally immersed into a commercially available polyimide precursor solution (U varnish S, commercially available from Ube Industries, Ltd.) to form a coated film of the solution. Next, the coated film heated at 140° C. for 30 minutes to evaporate a solvent in the coated film. Then it was heated at 200° C. for 30 minutes, and subsequently was heated at 400° C. for 30 minutes to form a polyimide film with a thickness of 40 μm. Then, the polyimide film was demolded to obtain a polyimide tube. Next, both ends of the obtained polyimide tube in the longitudinal direction perpendicular to the circumferential direction were cut to form a polyimide tube having a length of 300 mm.

Next, a cylindrical core having an outer diameter of 30 mm and a longitudinal length of 300 mm was provided, and an outer peripheral surface was covered with the resultant polyimide tube. Next, in a central area on the outer peripheral surface of the polyimide tube, the area having a width of 110 mm from a center in the longitudinal direction towards the both ends of the polyimide tube, i.e. a total width of the central area being 220 mm, an ink (trade name: DNS163; manufactured by Daicel Corporation) of which silver nanoparticles was compounded, was applied by an ink-jet method in the circumferential direction of the polyimide tube to form ring-shaped electro-conductive areas each of which extended towards the circumferential direction of the polyimide tube. Then, firing was performed at 300° C. for 30 minutes and the electro-conductive layer constituted by a plurality of electro-conductive areas was formed. Each of the electro-conductive areas has a width in the longitudinal direction of the polyimide tube was 300 μm, an interval of 200 μm and a maximum thickness of 2 μm.

Next, on the electro-conductive layer **20*b*, a commercially available polyimide precursor solution (U varnish S, commercially available from Ube Industries, Ltd.) was applied to the entire surface by ring coating, firing was then performed at 200° C. for 30 minutes, firing was additionally performed at 400° C. for 30 minutes for imidization, and the resinous layer 20*e*** with a film thickness of 40 μm was formed. The resinous layer covered an exposed surface of the polyimide tube, i.e. an outer surface of the polyimide tube which was not covered with the electro-conductive areas, and surfaces of the electro-conductive areas.

Next, a primer (product name: DY39-051A/B, commercially available from Dow Toray Co., Ltd.) was applied substantially uniformly onto the outer circumferential surface of the resinous layer **20*e*** so that the dry weight was 20 mg, the solvent was dried and a baking treatment was then performed in an electric furnace set at 160° C. for 30 minutes.

A silicone rubber composition layer with a thickness of 250 μm was formed on the primer by a ring coating method, primary cross-linking was performed at 160° C. for 1 minute, and secondary cross-linking was then performed at 200° C. 30 minutes to form the elastic layer **20*c***.

Here, the following silicone rubber composition was used.

As an organopolysiloxane having an alkenyl group as the component (a), a vinylated polydimethylsiloxane having at least two or more vinyl groups in one molecule (product name: DMS-V41, commercially available from Gelest, a number-average molecular weight of 68,000 (in terms of polystyrene), a vinyl group molar equivalent of 0.04 mmol/g) was prepared.

In addition, as an organopolysiloxane having Si—H groups as the component (b), a methyl hydrogen polysiloxane having at least two or more Si—H groups in one molecule (product name: HMS-301, commercially available from Gelest, a number-average molecular weight of 1,300 (in terms of polystyrene), a Si—H group molar equivalent of 3.60 mmol/g) was prepared. 0.5 parts by mass of the component (b) was added to 100 parts by mass of the component (a) and sufficiently mixed to obtain an addition-curable silicone rubber stock solution.

In addition, regarding the amount of the catalyst (component (c)), a very small amount of an addition-curing reaction catalyst (platinum catalyst: platinum carbonylcyclovinylmethylsiloxane complex) and an inhibitor were added and sufficiently mixed.

High-purity true spherical alumina (product name: Alumina Beads CB-A10S; commercially available from Showa Titanium Co., Ltd.) as a thermally conductive filler (component (d)) was added to and kneaded with the addition-curable silicone rubber stock solution at a volume ratio of 45% based on the elastic layer. Then, an addition-curable silicone rubber composition having a durometer hardness of 10° according to Japanese Industrial Standard (JIS) K 6253-3:2023 (Type A Durometer hardness) after curing was obtained.

Next, an addition-curable silicone rubber adhesive (product name: SE1819CV A/B, commercially available from Dow Toray Co., Ltd.) for forming the adhesive layer **20*f* was applied substantially uniformly onto the obtained elastic layer 20*c* so that the thickness was about 20 μm. A fluororesin tube with an inner diameter of 29 mm and a thickness of 50 μm (product name: NSE, commercially available from Gunze Ltd.) for forming the surface layer 20*d*** was laminated thereon while expanding its diameter.

Then, by uniformly rubbing the surface of the belt from above the fluororesin tube, an excessive adhesive was removed from between the elastic layer **20*c* and the fluororesin tube so that the thickness was as thin as about 5 μm. Next, the adhesive was cured by heating at 200° C. for 30 minutes, the fluororesin tube was fixed on the elastic layer 20*c***, and finally both ends were cut to have a length of 240 mm to obtain a fixing belt having an endless shape.

Example 2

A fixing belt was produced in the same manner as in Example 1 except that the thickness of the electro-conductive layer was changed to 3 μm.

Example 3-4

Fixing belts were produced in the same manner as in Example 1 except that the firing temperature of the electro-conductive layer were set as shown in Table 1 respectively.

Example 5

A fixing rotating member was produced in the same manner as in Example 1 except that a polyamide imide solution (Vylomax HR-16NN, commercially available from Toyobo Co., Ltd.) was used as the material of the resinous layer **20*e* and applied to the entire surface by ring coating and firing was then performed at 200° C. for 30 minutes to form the resinous layer 20*e*** with a film thickness of 40 μm.

Example 6-7

Fixing belts were produced in the same manner as in Example 5 except that the firing temperature of the electro-conductive layer were set as shown in Table 1.

Comparative Example 1

A fixing rotating member was produced in the same manner as in Example 1 except that the electro-conductive layer **20*b*** was formed by a silver plating method.

Formation of the electro-conductive layer **20*b*** by the silver plating method was performed by the following method.

A cylindrical polyimide film was prepared, and a ring-shaped masking material was arranged on its surface. Subsequently, a plating treatment was performed using a potassium silver cyanide bath as a silver plating bath. The pH of the plating bath was maintained at 8 to 9, and the temperature of the plating bath was maintained at 50° C. to 70° C. After being taken out of the plating bath, the masking material was removed through a washing step, and a base layer on which an electro-conductive layer with a thickness of 2.0 μm was formed was obtained.

Comparative Example 2

A fixing rotating member was produced in the same manner as in Example 4 except that the firing temperature of the electro-conductive layer **20*b*** was set to 120° C.

Comparative Example 3

A fixing rotating member was produced in the same manner as in Example 1 except that copper was used as the material of the electro-conductive layer **20*b*** and the electro-conductive layer was fired under a nitrogen atmosphere. The obtained conductive layer had a volume resistivity of $7.5\times10^{-7}$ Ω·m, and when image evaluation was performed using an actual machine, heat generation was in sufficient, and image defects occurred.

This is thought to be caused by the fact that oxidation of copper proceeded when the resinous layer was formed and the volume resistivity of the electro-conductive layer increased.

Cross Section Observation of Electro-conductive Layer and Image Processing

From the fixing belt, 20 samples each having a length of 5 mm, a width of 5 mm and a thickness equal to the total thickness of the fixing belt were collected from an arbitrary location on the fixing belt. Each of the obtained samples was polished so that a cross section along the circumferential direction of the fixing belt in the total thickness direction of the fixing belt was exposed with an ion milling device (product name: IM4000, by Hitachi High-Technologies Corporation). Here, polishing of the cross section by ion milling allows herein preventing particles from sloughing off the sample, and preventing abrasive contamination, while making it possible to form a cross section exhibiting few polishing marks.

Then, a cross section in the thickness direction of the electro-conductive layer exposed in the polished cross section of each of the samples, was subsequently observed with Schottky Field Emission Scanning Electron Microscope (SEM) provided with energy dispersive X-ray spectrometer (EDS) (product name: FE-SEM JSM-F100, by JEOL Ltd.), to obtain a cross-sectional image. As an observation condition, a backscattered electron image mode at 20000 magnifications was employed, and as condition for the backscattered electron image acquisition, an acceleration voltage was set at 3.0 kV and a working distance was set at 3 mm.

Then, binarization processing was performed on the resultant cross sectional image so that crystalline particles were displayed in white and parts other than crystalline particles were displayed in black. As the binarization method, Otsu's method disclosed in IEEE Transactions on SYSTEMS, MAN, AND CYBERNETICS, Vol. SMC-9, No. 1, January 1979, pp. 62-66, was employed. Specifically, first, the cross sectional image was read using image analysis software (Product name: ImageProPlus, commercially available from MediaCybernetics), an image was cut out in a size range of 0.5 μm×0.5 μm at an arbitrary location, and the brightness distribution of the image was obtained. Next, from the brightness distribution, a binarized image in which an area corresponding to silver crystal and other area was distinguished, was obtained in accordance with the Otsu's method.

Calculation of Porosity

In the binarized image acquired in the procedure, metal crystal particles were expressed as a white area. The porosity was calculated by calculating the area occupied by these crystalline particles in the image. Specifically, in the binarized image, a number of pixels corresponding to a crystal of silver was counted, and then an area occupied by the crystal was calculated by multiplying the number of pixels by the area of one pixel (0.15×0.15=0.0225 $\mu m^2$). Since the porosity indicates a proportion of spaces not occupied by crystalline particles in the electro-conductive layer, it was determined as follows using the area occupied by crystalline particles obtained above.

$$\text{porosity}=\{\text{area of binarized image}(0.5\times0.5(\mu m^2))-\text{area occupied by crystalline particles}(\mu m^2)\}/\text{area of binarized image}(0.5\times0.5(\mu m^2))\times100$$

The arithmetic mean value of the porosity calculated by the above procedure from 20 samples was taken as the porosity of the electro-conductive layer.

Purity of Silver in the Electro-Conductive Layer

An elemental analysis was carried out on the cross section of the electro-conductive layer exposed on the polished surface of the sample. The elemental analysis was carried out with EDS mounted on the JSM-F100 under the condition of acceleration voltage of 5~15 kV and magnification of 4000 times. In addition, the elemental analysis was carried out on arbitrary three (3) sites in the cross section of the electro-conductive layer. Accordingly, the elemental analysis was carried out at total 60 sites, i.e. 3 sites×20 samples.

Then the arithmetic mean value of the purity of silver obtained at 60 sites was taken as the purity of silver in the electro-conductive layer of the observed fixing belt.

Evaluation: Compressive Elastic Modulus

<Electro-Conductive Layer>

The compressive elastic modulus of the electro-conductive layer was measured by the following method.

First, the surface layer and the elastic layer were peeled off from the fixing rotating member, and a laminate of the base layer, the electro-conductive layer, and the resinous layer was taken out. Next, a polyimide film removing agent (e solve 21KZE-100, commercially available from Kaneko Chemical Co., Ltd.) was applied to the surface of the resinous layer and heated at 40° C. for 10 minutes.

Then, cooling was performed to room temperature, i.e. 25° C., washing with pure water was then performed, drying was performed to remove the resinous layer, and the electro-conductive layer on the surface opposite to the surface that faced the base member was exposed. The compressive elastic modulus of the surface of the exposed electro-conductive layer was measured using a Berkovich type indenter using a micro indentation hardness test machine (product name: Nano Indenter G200, commercially available from Agilent Technologies, Inc.).

Here, the measurement area was indented with the indenter to a depth of 1 μm in the thickness direction from the first surface of the electro-conductive layer opposite to the surface facing the base layer, an average value of compression moduli at the depth positions measured in a region of 10 to 20% with respect to the indented depth, i.e. 1 μm, that is, a depth region of 0.1 μm to 0.2 μm from the first surface, was calculated. The average value of the elastic moduli was taken as the compressive elastic modulus of the electro-conductive layer. The measurement of the compressive elastic modulus was conducted under the conditions of the temperature of 25° C. and relative humidity of 50%. The results are shown in Table 1-2.

<Base Member>

The compressive elastic modulus of the base member was measured in the same manner as that of the electro-conductive layer. In the measurement, the Berkovic type indenter was brought into contact with a first surface of the base member opposite to a surface facing the electro-conductive layer and indented into the base member.

Evaluation: Actual Machine Durability Test

The fixing belts of Examples 1 to 7 and Comparative Examples 1 to 3 were subjected to a paper passing durability test under the following conditions.

Each of the fixing belts of Examples 1 to 7 and Comparative Examples 1 to 3 was incorporated into a fixing device, the fixing device was mounted in a laser printer (product name: Satera LBP961Ci; manufactured by Canon Inc.), and in an environment of an atmospheric temperature of 15° C. and a humidity of 10%, a paper passing durability test was performed by passing 2 million sheets of A4 sized paper (product name: Color laser NPI high-quality thick mouth, A4 size, tidal volume of 128 $g/m^2$, thickness of 148 μm; manufactured by Canon Marketing Japan) without printing any image, and for every 10,000 sheets, it was checked whether there was any deformation in the base member at the position corresponding to a position where the edge of the paper was contacted. Here, the laser printer was modified so that the pressing roller and the fixing rotating member could be rotated at a higher speed (a line speed of 400 mm/s) than usual was used.

Further, after the passing of 2 million sheets of paper, cyan colored solid image was formed on a sheet of paper with the laser printer. The resultant solid image was checked with naked eye whether there were image defects and evaluated in accordance with the following criteria.

Rank A: Any deformation was not observed in the base member, and any image defects were not observed in the solid image even after the passing of 2 million sheets of paper.

Rank B: After the passing of 2 million sheets of paper, deformation was observed in the base member at a position corresponding to a position where the edge of the paper was brought into contact. On the other hand, in the solid image, any image defects resulting from the deformation were not observed.

Rank C: Before the number of sheets was reached to 2 million, deformation was observed in the base member at a position corresponding to a position where the edge of the paper was brought into contact. Further, in the solid image, image defects resulting from the deformation were observed. The evaluation results are shown in Table 1-2. In addition, in the remarks of Table 1-2, regarding Comparative examples 1-3, the number of sheets for which the deformation of the base member was first observed was described.

TABLE 1-1

| | | | Electro-conductive layer | | | | Resinous layer | |
|---|---|---|---|---|---|---|---|---|
| | | Base member Material | Forming method | Firing temperature (° C.) | Maximum thickness (μm) | Volume resistivity $\times 10^{-8}$ ($\Omega \cdot m$) | Material | Firing temperature (° C.) |
| Example | 1 | PI | Application of ink containing SILVER nano particles | 300 | 2 | 2.8 | PI | 400 |
| | 2 | PI | same as above | 300 | 3 | 2.8 | PI | 400 |
| | 3 | PI | same as above | 250 | 2 | 3.7 | PI | 400 |
| | 4 | PI | same as above | 200 | 2 | 4.7 | PI | 400 |
| | 5 | PI | same as above | 300 | 2 | 2.8 | PAI | 200 |
| | 6 | PI | same as above | 250 | 2 | 4.7 | PAI | 200 |
| | 7 | PI | same as above | 200 | 2 | 5.7 | PAI | 200 |
| Comparative Example | 1 | PI | SILVER plating | — | 2 | 2.0 | PI | 400 |
| | 2 | PI | Application of ink containing SILVER nano particles | 120 | 2 | 6.0 | PAI | 200 |
| | 3 | PI | Application of ink containing CUPPER nano particles | 300 ($N_2$ atmosphere) | 2 | 75.0 | PI | 400 |

TABLE 1-2

| | | Evaluation | | | | | |
|---|---|---|---|---|---|---|---|
| | | | | Compression elastic modulus (Gpa) | | Dulability test in electrophotographic apparatus | |
| | | Purity of silver (wt %) | Porosity (%) | Electro-conductive layer | Base member | Rank | Remarks |
| Example | 1 | 99.9 | 40 | 11 | 5 | A | — |
| | 2 | 99.9 | 38 | 10 | 5 | B | — |
| | 3 | 99.9 | 25 | 27 | 5 | B | — |
| | 4 | 99.8 | 17 | 24 | 5 | B | — |
| | 5 | 99.9 | 39 | 13 | 5 | A | — |
| | 6 | 99.8 | 23 | 26 | 5 | B | — |
| | 7 | 99.7 | 17 | 26 | 5 | B | — |
| Comparative Example | 1 | 99.9 | 0 | 97 | 5 | C | 0.8 million |
| | 2 | 99.6 | 10 | 40 | 5 | C | 1 million |
| | 3 | — | 30 | 15 | 5 | C | 10000 sheets |

In Table 1-1, PI indicates polyimide, and PAI indicates polyamide imide.

Based on the results in Tables 1-1 and 1-2, it can be understood that, when the compressive elastic modulus of the electro-conductive layer was kept low, even when used durably as the fixing rotating member, there was no buckling deformation and the durability was high. In addition, it can be understood that, in Examples 1 to 7, the volume resistivity of the electro-conductive layer was low to the extent that the conductivity could be maintained, and the occurrence of image defects could be reduced.

The compressive elastic modulus of the electro-conductive layer was kept low as the porosity increased. In addition, it can be understood that, when a silver nano ink was used as a metal type, the porosity could be adjusted according to the firing temperature of the electro-conductive layer. If the firing temperature was higher, the porosity was larger, and the compressive elastic modulus could be reduced.

According to one aspect of the present disclosure, there is provided a fixing rotating member having high conductivity and excellent durability. In addition, according to another aspect of the present disclosure, there is provided a fixing device using the fixing rotating member. In addition, according to still another aspect of the present disclosure, there is provided an electrophotographic image forming device using the fixing device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. This application claims the benefit of Japanese Patent Application No. 2022-171566, filed Oct. 26, 2022, and Japanese Patent Application No. 2023-180568 filed on Oct. 19, 2023, which are hereby incorporated by reference herein in their entirety.

What is claimed is:

1. A fixing rotating member comprising:

a cylindrical base member comprising at least a resin;

an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer comprising silver, the electro-conductive layer having a volume resistivity of $1.0\times10^{-8}$ to $8.0\times10^{-8}$ Ω·m, and the electroconductive layer having a compressive elastic modulus of 8 to 30 GPa, the compressive elastic modulus being measured by contacting an indenter with a first surface of the electroconductive layer opposite to a surface facing the base member, and the compressive elastic modulus being an average value of compressive elastic moduli of a thickness region of 0.1 to 0.2 μm from the first surface of the electroconductive layer.

2. The fixing rotating member according to claim 1, wherein the resin is at least one selected from the group consisting of polyimide and polyamide imide.

3. The fixing rotating member according to claim 1, wherein a maximum thickness of the electro-conductive layer is 4 μm or less.

4. The fixing rotating member according to claim 1, wherein, in a cross sectional view of the electro-conductive layer in the circumferential direction, the electro-conductive layer has pores.

5. The fixing rotating member according to claim 4, wherein, in the cross sectional view of the electro-conductive layer, the electro-conductive layer has a porosity of 15 to 50%.

6. The fixing rotating member according to claim 1, wherein the electro-conductive layer substantially consists of silver.

7. The fixing rotating member according to claim 1, wherein the electro-conductive layer is a sintered body of a silver nanoparticle.

8. The fixing rotating member according to claim 1, wherein in a cross sectional view in a direction perpendicular to a circumferential direction of the fixing rotating member, the electroconductive layer includes a plurality of electroconductive areas, the plurality of electroconductive areas being electrically independent from each other.

9. The fixing rotating member according to claim 1, wherein the compressive elastic modulus of the electro-conductive layer is 6 times or less of a compressive elastic modulus of the base member, the compressive elastic modulus of the base member being an average value of compressive elastic moduli of a thickness region of 0.1 to 0.2 μm from a first surface of the base member.

10. The fixing rotating member according to claim 1, wherein a compressive elastic modulus of the base member is 2.5 to 6.0 GPa.

11. The fixing rotating member according to claim 1, wherein a resin contained in the resinous layer includes at least one selected from the group consisting of polyimide and polyamide imide.

12. The fixing rotating member according to claim 1, wherein the resin contained in the base member includes polyimide, and a resin contained in the resinous layer includes polyamide imide.

13. A fixing device comprising:

a fixing rotating member; and an induction heating device for heating the fixing rotating member by induction heating, wherein the fixing rotating member comprises:

a cylindrical base member comprising at least a resin;

an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer comprising silver, the electro-conductive layer having a volume resistivity of $1.0\times10^{-8}$ to $8.0\times10^{-8}$ Ω·m, and the electroconductive layer having a compressive elastic modulus of 8 to 30 Gpa, the compressive elastic modulus being measured by contacting an indenter with a first surface of the electroconductive layer opposite to a surface facing the base member, and the compressive elastic modulus being an average value of compressive elastic moduli of a thickness region of 0.1 to 0.2 μm from the first surface of the electroconductive layer.

14. The fixing device according to claim 13, wherein the induction heating device comprises:

an excitation coil which is arranged inside the fixing rotating member, has a helical shape part a helical axis of which is substantially parallel to a direction along a rotation axis of the fixing rotating member, and generates an alternating magnetic field that causes electromagnetic induction heating of the electro-conductive layer; and a magnetic core which is arranged in the helical shape part, extends in the rotation axis direction, and does not form a loop outside the fixing rotating member, and which is for inducing magnetic lines of force of the alternating magnetic field, and wherein a material of the magnetic core is a ferromagnet, and the electro-conductive layer of the fixing rotating member is heated with an induced current induced by the magnetic lines of force that exit from one longitudinal end of the magnetic core, pass through an outside of the electro-conductive layer, and return to the other longitudinal end of the magnetic core.

15. An electrophotographic image forming device, comprising:

an image bearing member that carries a toner image;

a transfer device that transfers the toner image to a recording material; and a fixing device that fixes the transferred toner image to the recording material, the fixing device comprising:

a cylindrical base member comprising at least a resin;

an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer comprising silver, the electro-conductive layer having a volume resistivity of $1.0\times10^{-8}$ to $8.0\times10^{-8}$ Ω·m, and the electroconductive layer having a compressive elastic modulus of 8 to 30 GPa, the compressive elastic modulus being measured by contacting an indenter with a first surface of the electroconductive layer opposite to a surface facing the base member, and the compressive elastic modulus being an average value of elastic moduli of a thickness region of 0.1 to 0.2 μm from the first surface of the electroconductive layer.

16. A method of producing a fixing rotating member, in which the fixing rotating member comprises:

a cylindrical base member comprising at least a resin;

an electro-conductive layer on the base member; and a resinous layer on a surface of the electro-conductive layer, the surface being opposed to a surface facing the base member, the electro-conductive layer extending in a circumferential direction of an outer circumferential surface of the base member, the electro-conductive layer comprising silver, the electro-conductive layer having a volume resistivity of $1.0\times10^{-8}$ to $8.0\times10^{-8}$ $\Omega\cdot m$, and the electroconductive layer having a compressive elastic modulus of 8 to 30 GPa, the compressive elastic modulus being measured by contacting an indenter with a first surface of the electroconductive layer opposite to a surface facing the base member, and the compressive elastic modulus being an average value of compressive elastic moduli of a thickness region of 0.1 to 0.2 μm from the first surface of the electroconductive layer, the production method comprising:

(i) a step of obtaining the base member;

(ii) a step of obtaining an electro-conductive layer by applying a silver nanoparticle ink onto the outer circumferential surface of the base member obtained in the step (i) and performing firing; and (iii) a step of obtaining a resinous layer by applying a resin material onto the electro-conductive layer obtained in the step (ii) and performing firing.

* * * * *